(12) United States Patent
Larikka

(10) Patent No.: US 8,667,876 B2
(45) Date of Patent: Mar. 11, 2014

(54) PIPE CUTTING APPARATUS

(75) Inventor: Leo Larikka, Vantaa (FI)

(73) Assignee: Larikka Oy, Vantaa (FI)

( * ) Notice: Subject to any disclaimer, the term of this patent is extended or adjusted under 35 U.S.C. 154(b) by 383 days.

(21) Appl. No.: 13/146,460

(22) PCT Filed: Jan. 28, 2010

(86) PCT No.: PCT/FI2010/050047
§ 371 (c)(1),
(2), (4) Date: Sep. 21, 2011

(87) PCT Pub. No.: WO2010/089449
PCT Pub. Date: Aug. 12, 2010

(65) Prior Publication Data
US 2012/0024120 A1    Feb. 2, 2012

(30) Foreign Application Priority Data

Feb. 3, 2009   (FI) ...................................... 20095098

(51) Int. Cl.
*B23D 21/04*    (2006.01)
*B23D 21/00*    (2006.01)

(52) U.S. Cl.
USPC ............................................. 82/113; 82/70.2

(58) Field of Classification Search
USPC ................. 82/59, 70.2, 113, 101; 30/101
See application file for complete search history.

(56) References Cited

U.S. PATENT DOCUMENTS

| | | | |
|---|---|---|---|
| 3,916,519 A * | 11/1975 | Gilmore | 30/97 |
| 4,111,084 A * | 9/1978 | Matsumoto et al. | 82/48 |
| 4,813,314 A * | 3/1989 | Kwech | 82/113 |
| 5,609,081 A * | 3/1997 | Lin | 82/59 |
| 5,832,797 A * | 11/1998 | Cudnohufsky et al. | 82/118 |
| 5,933,963 A * | 8/1999 | Pierce | 30/97 |
| 6,109,151 A * | 8/2000 | Braun et al. | 82/48 |
| 6,786,118 B1 * | 9/2004 | Lumm et al. | 82/70.2 |
| 2005/0115371 A1 | 6/2005 | Ogawa | |

FOREIGN PATENT DOCUMENTS

SU           476104 A1    7/1975

OTHER PUBLICATIONS

Search Report from the Finnish Patent Office dated Jan. 20, 2010 in respect of Application No. 20095098.
English abstract of SU 476104 A1, Jul. 5, 1975.

* cited by examiner

*Primary Examiner* — Will Fridie, Jr.
(74) *Attorney, Agent, or Firm* — Ladas & Parry LLP

(57) ABSTRACT

The invention relates to a pipe cutting apparatus, comprising a tubular or box-like frame (1), a pipe clamp (9) inside the frame for immobilizing a pipe (P) to be cut, an annular blade carrier (3) rotatably bearing-mounted on the frame and provided with a central opening for the pipe to pass through, one or more blade arms (4) in attachment with the annular blade carrier (3) for movement mainly in a radial direction or in a slightly off-radial direction, a cutting blade (5) mounted on the blade arm (4), and means for actuating the blade arm (4) to enable feeding the cutting blade (5), rotating outside the pipe, towards the pipe for cutting the same by shearing. The means for ac-tuating the blade arm (4) include a spiral groove disc (6) rotatably bearing-mounted alongside the annular blade carrier (3), featuring a spiral groove (7) and a transition fin (8) extending from the blade arm (4) to the spiral groove (7), as well as elements (11, 12) for rotating the annular blade carrier (3) and the spiral groove disc (6) at a desired rotation speed ratio relative to each other.

9 Claims, 4 Drawing Sheets

PIPE CUTTING APPARATUS

The invention relates to a pipe cutting apparatus, comprising a tubular or box-like frame, a pipe clamp inside the frame for immobilizing a pipe to be cut, an annular blade carrier rotatably bearing-mounted on the frame and provided with a central opening for the pipe to pass through, one or more blade arms in attachment with the annular blade carrier for movement mainly in a radial direction or in a slightly off-radial direction, a cutting blade mounted on the blade arm, and means for actuating the blade arm to enable feeding the cutting blade, rotating outside the pipe, towards the pipe for cutting the same by shearing.

In addition to the apparatus preferably being capable of cutting pipes of varying diameters, the cutting of a pipe involves criteria as follows:
1. cut off, no other requirement
2. a burrless cut surface, no other requirement
3. an even cut surface, no other requirement
4. a uniform small burr on outer and/or inner surface, an even cut surface
5. in addition to the requirements of item 4, a chamfer on one of the four side edges
6. a chamfer or profile cut on all side edges
7. smooth cutting in an automated process and in compliance with the requirements of orbital welding without filler.

It is an object of the invention to provide an apparatus of the above-described type, which is apt for implementing any or all of the above-cited criteria set forth in items 4-7.

This object is achieved in the invention by means of characterizing features as defined in the appended claim 1. Preferred embodiments of the invention are presented in the dependent claims.

One exemplary embodiment of the invention will now be described more closely with reference to the accompanying drawings, in which FIG. 1 shows an apparatus of the invention in an axial section in a view from one side of the center axis;

Figure 1:
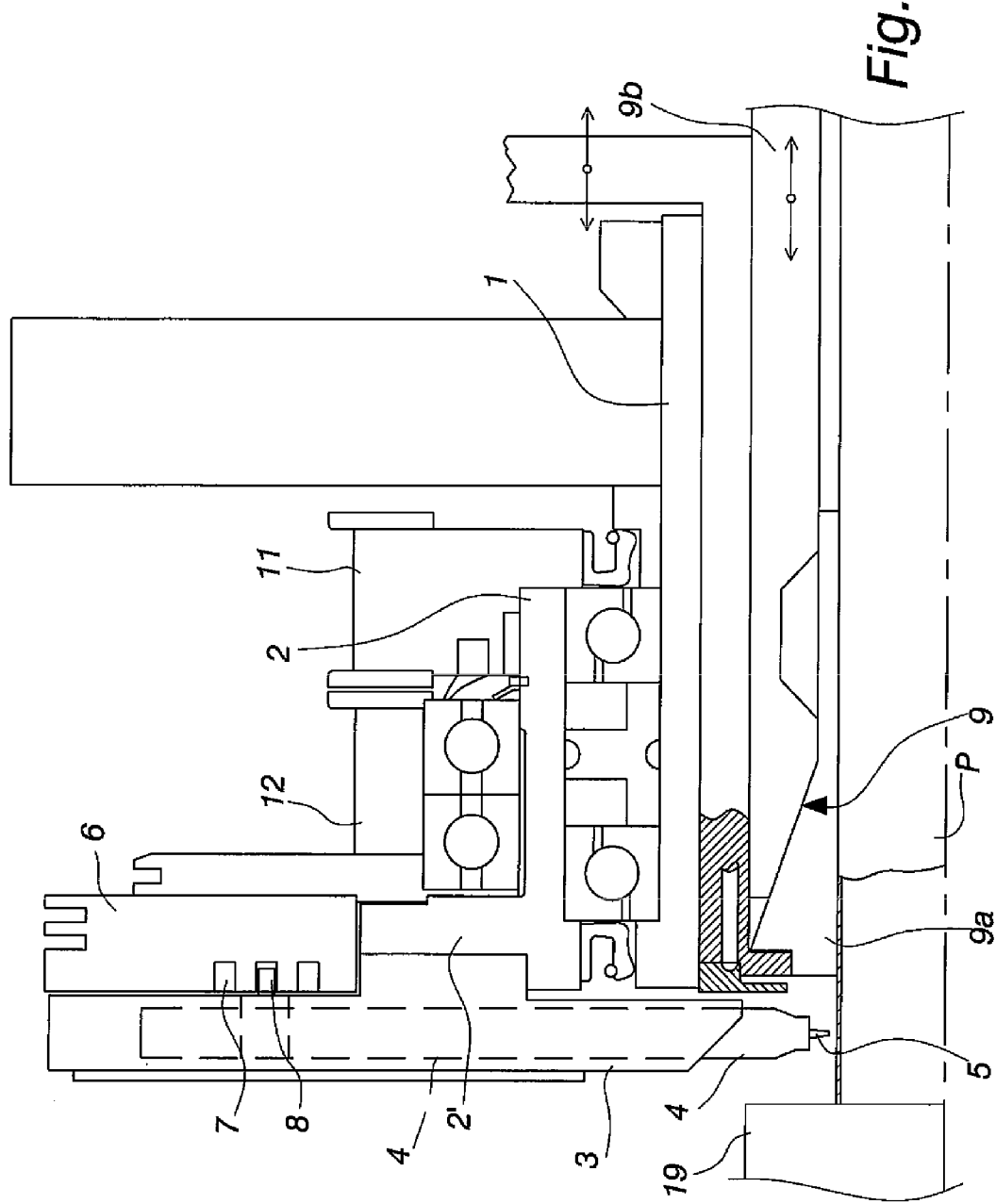
Figure 2:
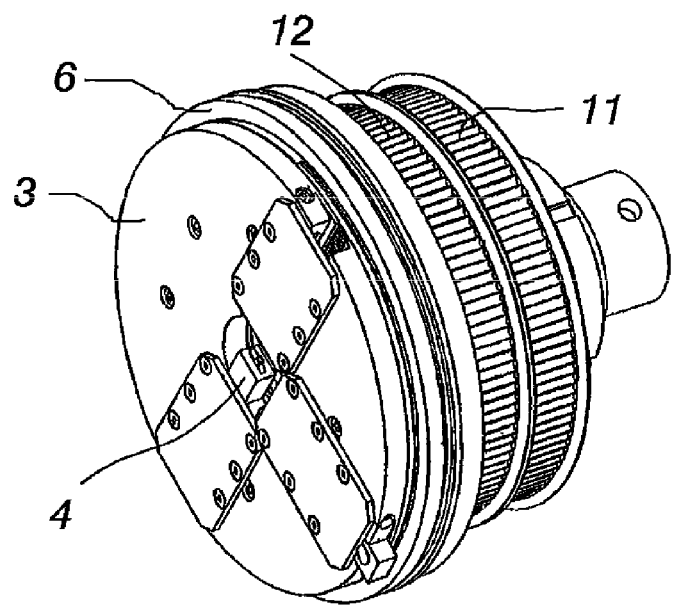
FIG. 2 shows a main portion of an apparatus of the invention in a perspective view.
Figure 3:
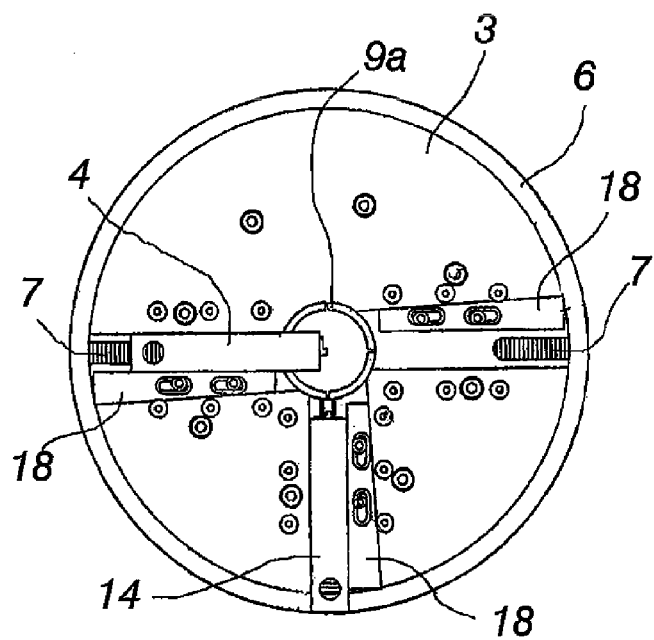
FIG. 3 shows the apparatus of FIG. 2 in an end view.
Figure 4:
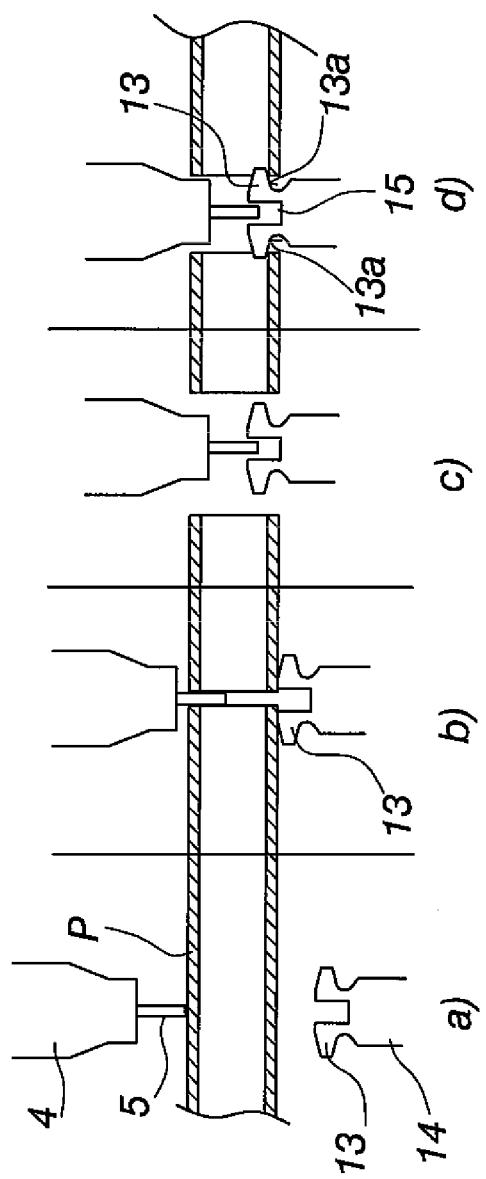

FIG. 4 shows cutting blade and chamfer blade positions in various working steps, including a) start of a cutting operation, b) a cutting operation and overrun for making an outer edge chamfer after displacing severed pipe segments slightly from each other, c) a displacement of severed pipe segments away from each other for bringing in a chamfer blade to a position for machining inner chamfers, and d) a chamfering operation of inner edges by pushing pipe segments towards each other.

Figure 5:
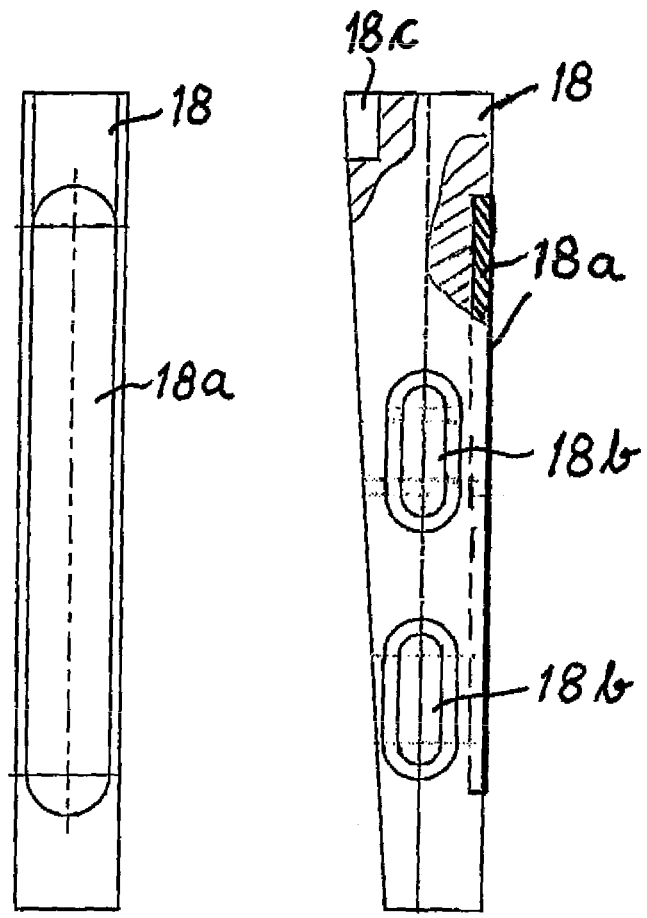

FIG. 5 shows a control wedge used in the apparatus.

The pipe cutting apparatus comprises a tubular or box-like frame 1 inside which is a pipe clamp 9 for immobilizing a pipe P to be cut. The actual clamp is made up by a spline chuck 9a, having its end divided into sectors for radial movement. The spline sectors of the spline chuck 9a are actuated radially by means of a second spline chuck 9b, which is operable e.g. by a pneumatic cylinder axially back and forth with respect to other components. An inner diameter of the replaceable spline chuck 9a is selected to match each pipe diameter. Minor variations in pipe diameter are possible also with one and the same spline chuck 9a. The portion of pipe external of the cutting apparatus is held by a similar type pipe clamp 19. Pipe clamps of this type are prior known and do not involve anything novel in the invention.

Rotatably bearing-mounted on the frame 1, through the intermediary of a tube 2, is an annular blade carrier 3 provided with a central opening for a pipe to pass through.

One or more blade arms 4 are mounted in a sliding fashion on the annular blade carrier 3 for movement mainly in a radial direction, but preferably in a direction slightly divergent from the radial direction. Attached to the blade arm 4 is a cutting blade 5. By means of subsequently further detailed elements, the blade arm 4 is movable to enable advancing the cutting blade 5, which is rotating outside a pipe, towards the pipe for cutting the same by shearing. Thus, in a cutting operation the pipe is stationary and the shearing blade is revolving outside the pipe. Thereby is achieved a chip-forming cutting action, resulting in a chip which is continuous and long, i.e. the cutting operation does not produce small scrap sticking to the pipe surface.

The means set for actuating the blade arm and the blade include a spiral groove disc 6 rotatably bearing-mounted alongside the annular blade carrier 3, featuring a spiral groove 7 and a transition fin 8 extending from the blade arm 4 to the spiral groove 7. Belt pulleys 11 and 12 are used for rotating the spiral groove disc 6 and the annular blade carrier 3 at a desired rotation speed relative to each other. Motors driving the belt pulleys 11 and 12 are programmed to actuate the belts at desired speeds over distances of a desired length, whereby, respectively, the motion speed and traveling distance of the blades 5 are adjustable.

In terms of structural aspects, the configuration is such that the spiral groove disc 6 is mounted with bearings around a tube 2 revolving along with the annular blade carrier 3. The belt pulley 11 rotating the annular blade carrier 3 is attached to the tube 2, which is thus bearing-mounted around the tubular frame 1. The annular blade carrier 3 is attached to the tube 2 with a mounting flange 2'.

Typically, the annular blade carrier 3 includes two blade arms 4 on opposite sides of a central opening, whereby, as the annular blade carrier 3 and the spiral groove disc 6 are rotating relative to each other, the cutting blades 5 travel simultaneously and over an equal distance along such orbits on opposite sides of the pipe's center axis that the cutting blades are able to by-pass each other without collision. This overrun of the blades is necessary for the subsequently described use of chamfer blades.

In order to establish favorable incidence angles for the blade and the pipe, the invention involves an insight that the blade arm 4 and, respectively, the blade 5 are provided with a motion direction which diverges slightly from a radial direction, such that, while proceeding towards a pipe, the blade 4 at the same time approaches a radius extending by way of the annular blade carrier's 3 axis of rotation.

The apparatus according to the invention preferably includes also a chamfer blade 13, which is attached with a blade arm 14 to the annular blade carrier 3 for movement mainly in a radial direction or in a slightly off-radial direction.

The chamfer blade 13 is set in such a position relative to the cutting blade 5 that the chamfer blade 13 lies externally of the pipe's surface as the pipe has been sheared off by the cutting blade 5. Operation of the chamfer blade 13 is elucidated by steps a)-d) of FIG. 4. As indicated in step c), the segments of a severed pipe have been displaced away from each other prior to propelling the chamfer blade 13 to a chamfer machining position at which a chamfer is machined by the chamfer blade on the inner edge of both sheared ends as the pipes are propelled towards each other (step d). Therefore, the chamfer blade 13 includes a blade edge 13a which removes a burr and/or cuts chamfers on the inner edges as the severed pipe segments are pushed axially towards each other. Naturally, the chamfer blade can also be designed as a V-blade capable of machining all four blade edges simultaneously as the pipes are pushed towards each other and both pipe ends proceed to the V-blade.

In order to enable overrunning the cutting blade 5 to a position at which the chamfer blade is in an inner edge machining position, the chamfer blade 13 is provided with a slot 15 for receiving the cutting blade 5 in this position. The blade 5 protrudes from the supporting blade arm 4 to the extent at least equal to the wall thickness of a pipe to be sheared. An initial portion of the blade arm 4 is narrower than the rest of the arm over a length segment which is necessarily driven between the severed ends of the pipes as the chamfer blade 13 is propelled in and, for machining a chamfer, the pipes are drawn closer to the chamfer blade (and to each other)

A sliding slot for the blade arm 4 in the annular blade carrier 3 is in the shape of a keyway. Between the blade arm 4 and the annular carrier 3 is a control wedge 18 that can be used for adjusting the kinetic sensitivity of the blade arm and the blade. The movement of the blade arm 4 must involve a sufficient amount of motion-opposing friction force for preventing potential chipping forces from snatching the blade in (not allowing uncontrolled biting of the blade)

Being forced by a fin 8 extending along the spiral groove disc 6, the blade arm 4 travels in its sliding slot against this friction force inward or outward, depending on which one of the elements 3 and 6 is rotating faster.

The control wedge 18 shown in FIG. 5 has embedded therein a slightly elastic friction-slide material 18*a*, against which the blade arm 4 is leaning and sliding and whereby an adjustment of the blade arm's kinetic force can be performed more easily than with two face-to-face steel surfaces. The control wedge 18 features elongated attachment holes 18*b* and a recess 18*c* for an adjustment screw used for moving the wedge 18.

The invention claimed is:

1. A pipe cutting apparatus, comprising a tubular or box-like frame (1), a pipe clamp (9) inside the frame for immobilizing a pipe (P) to be cut, an annular blade carrier (3) rotatably bearing-mounted on the frame and provided with a central opening for the pipe to pass through, one or more blade arms (4) in attachment with the annular blade carrier (3) for movement mainly in a radial direction or in a slightly off-radial direction, a cutting blade (5) mounted on the blade arm (4), and means for actuating the blade arm (4) to enable feeding the cutting blade (4), rotating outside the pipe, towards the pipe for cutting the same by shearing, characterized in that the means for actuating the blade arm (4) include a spiral groove disc (6) rotatably bearing-mounted alongside the annular blade carrier (3), featuring a spiral groove (7) and a transition fin (8) extending from the blade arm (4) to the spiral groove (7), as well as elements (11, 12) for rotating the annular blade carrier (3) and the spiral groove disc (6) at a desired rotation speed ratio relative to each other.

2. An apparatus according to claim 1, characterized in that the annular blade carrier (3) comprises two blade arms (4) on opposite sides of the central opening, whereby, as the annular blade carrier (3) and the spiral groove disc (6) rotate relative to each other, the cutting blades (5) travel simultaneously and over an equal distance along such orbits on opposite sides of the pipe's center axis that the cutting blades are able to by-pass each other without collision.

3. An apparatus according to claim 1, characterized in that the motion direction of the blade arm or arms (4) and respectively that of the cutting blade or blades (5) are slightly divergent from a radial direction, such that, while proceeding towards a pipe, the blade (4) at the same time approaches a radius extending by way of the annular blade carrier's (3) axis of rotation.

4. An apparatus according to claim 1, characterized in that the spiral groove disc (6) is bearing-mounted around a tube (2) revolving along with the annular blade carrier (3) and provided with a belt pulley (12), and the tube (2) revolving along with the annular blade carrier is provided with another belt pulley (11), and that motors driving the belt pulleys (11, 12) are programmed to move the belts at desired speeds over distances of a desired length.

5. An apparatus according to claim 1, characterized in that the apparatus includes a chamfer blade (13), which is attached with a blade arm (14) to the annular blade carrier (3) for movement mainly in a radial direction or in a slightly off-radial direction, and set in such a position relative to the cutting blade (5) that the chamfer blade (13) lies externally of the pipe's surface as the pipe has been sheared off by the cutting blade (5).

6. An apparatus according to claim 5, characterized in that the cut-off pipe segments are adapted to be displaced away from each other prior to propelling the chamfer blade (13) to a chamfer machining position at which a chamfer is machined by the chamfer blade simultaneously on both sheared ends.

7. An apparatus according to claim 6, characterized in that, in order to machine an inner edge chamfer on the pipe's sheared ends, the chamfer blade (13) includes a blade edge (13*a*) which removes a burr and/or cuts an inner edge chamfer as the severed pipe segments are pushed axially towards each other.

8. An apparatus according to claim 5, characterized in that the chamfer blade (13) features a slot (15), which is dimensioned for accommodating the cutting blade (5) in the slot (15) as the chamfer blade (13) is propelled to the chamfer machining position.

9. An apparatus according to claim 1, characterized in that the annular blade carrier (3) features a sliding slot for the blade arm (4) which is bounded by a control wedge (18), containing an elastic material (18*a*) against which the blade arm is leaning and sliding.

* * * * *